United States Patent [19]

Bresin

[11] 3,997,236
[45] Dec. 14, 1976

[54] SELF-LOCKING ELECTRICAL CONTACT ASSEMBLY

[75] Inventor: Mark Steven Bresin, Tamarac, Fla.

[73] Assignee: Motorola, Inc., Schaumburg, Ill.

[22] Filed: Mar. 3, 1975

[21] Appl. No.: 554,858

[52] U.S. Cl. .......................................... 339/221 R
[51] Int. Cl.² ......................................... H01R 9/16
[58] Field of Search ....... 339/220 R, 220 C, 220 L, 339/220 T, 221 R, 221 L, 221 M, 217 R, 217 S

[56] References Cited

FOREIGN PATENTS OR APPLICATIONS

| 32,308 | 11/1968 | Germany | 339/221 R |
| 1,171,975 | 6/1964 | Germany | 339/221 R |

Primary Examiner—Joseph H. McGlynn
Attorney, Agent, or Firm—James W. Gillman; Donald B. Southard; Phillip H. Melamed

[57] ABSTRACT

A hand-insertable, hand-removable electrical contact assembly is disclosed, which requires no special mounting tools or additional mounting components. The electrical contact assembly is especially adaptable for use in conjunction with battery charger apparatus, or the like. In one embodiment, a resilient contact arm or element having a reduced midsection is adapted for insertion into an associated slot in the assembly casing. The contact arm is inserted by bending it at the resilient midsection while sliding one end section of the contact arm into the casing slot. When the contact arm is released, the resiliency of the midsection causes the other end section of the contact arm to press against the surface of the casing and thereby lock the contact arm within the casing. The assembled contact element is readily removable by simply reversing the above procedure.

7 Claims, 3 Drawing Figures

U.S. Patent  Dec. 14, 1976  3,997,236
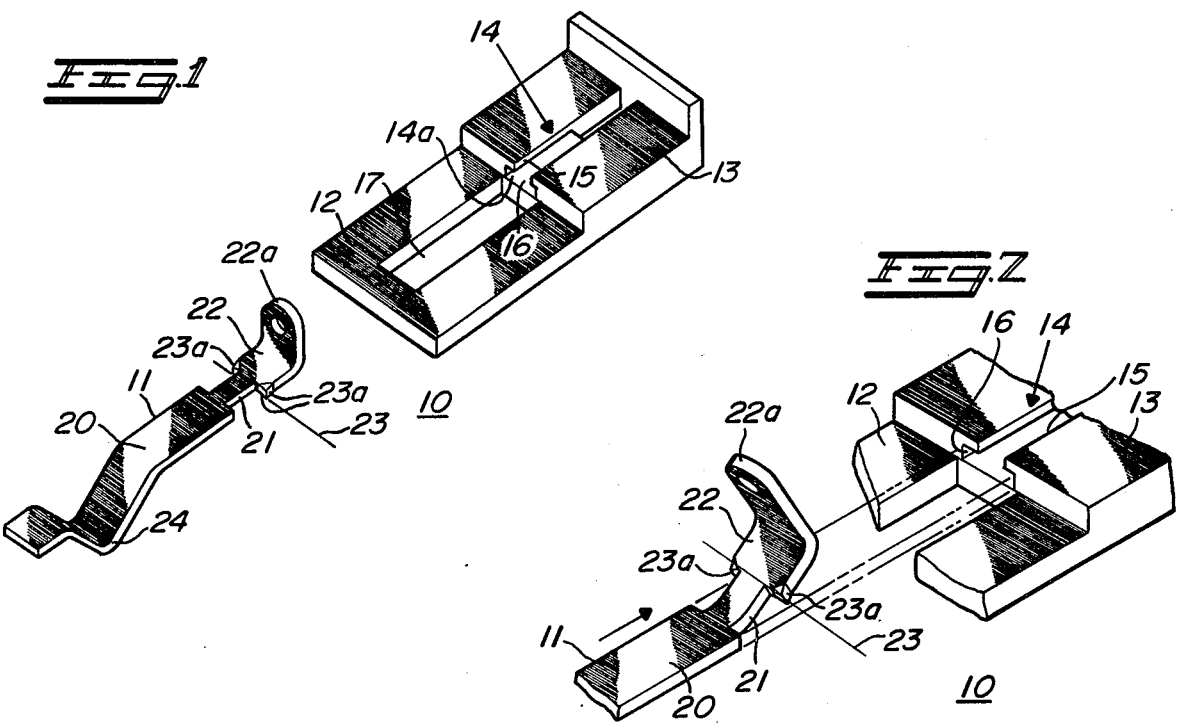
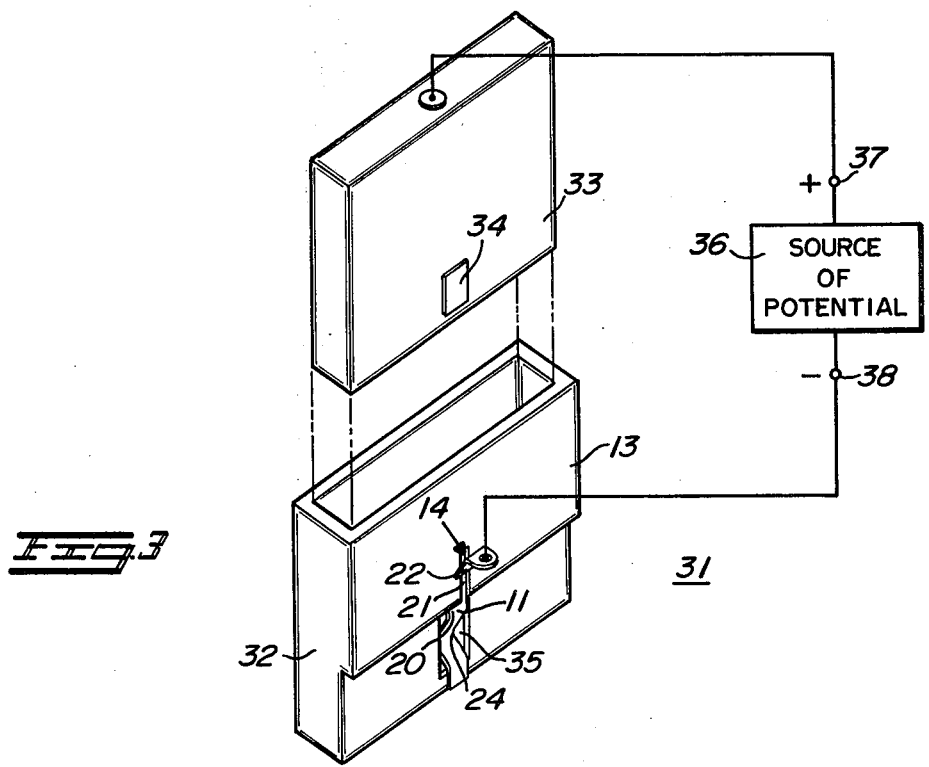

3,997,236

SELF-LOCKING ELECTRICAL CONTACT ASSEMBLY

BACKGROUND OF THE INVENTION

The invention relates generally to electrical contact assemblies and more particularly to an improved self-locking electrical slide contact assembly which requires no special tools for initial assembly or subsequent replacement.

Most electrical contact assemblies used in the prior art require additional mounting structures, such as rivets, screws, or other hardware, to attach or assemble the electrical contact elements to the assembly casing. The use of these additional mounting structures obviously increases the material cost of manufacturing contact assemblies, as well as the labor cost. Moreover, some of the prior art contact assemblies require the use of special tools to attach contact arms to the casing.

The use of additional components and special mounting tools not only increases the cost of the finished contact assembly but also makes field replacement of such assemblies difficult and impractical. A field surface repairman may have to replace an entire electrical contact assembly because he may not have the special tools required to replace a defective contact arm or element.

When mounting structures such as screws are used there is always a possibility of the screw becoming loose and causing the contact arm to shift in position and make an improper contact. Thus the reliability of prior electrical contact assemblies may depend, not only on the contact arm itself, but also on the mounting hardware used to attach the contact arm. Since the reliability of any assembly always decreases as the number of parts in the assembly increases, prior art electrical contact assemblies which require additional mounting structures are inherently less reliable.

SUMMARY OF THE INVENTION

An object of the present invention is to provide an improved and simplified electrical contact assembly which overcomes the aforementioned deficiencies.

A more particular object of the invention is to provide an improved electrical contact assembly which can be assembled and disassembled entirely by hand without the use of special tools.

Another object of the invention is to provide an improved reliable electrical contact assembly which requires no additional mounting hardware.

A further object of the invention is to provide an improved electrical contact assembly which can be simply and easily repaired.

A still further object of the invention is to provide an improved contact assembly which can be repaired in the field by the simple replacement of a defective contact arm.

In one embodiment of the present invention an improved electrical contact assembly having a hand-insertable and hand-removable self-locking electrical contact arm is provided. A contact arm having a first end portion, a reduced middle section, and a second end portion, and which is constructed of a resilient metallic material, is adapted for installation into an associated casing by inserting the same into an inverted, generally T-shaped slot positioned along one surface of the casing. The slot has an open end and includes a first, narrower outer channel in the surface of the casing, under which is a second somewhat wider inner channel. The first end portion of the contact arm is designed to be somewhat wider than the outer more narrower channel and makes a sliding fit within the second wider inner channel, and the reduced midsection of the contact arm makes a sliding fit within the first narrower outer channel. The installation of the associated contact arms or elements within the assembly casing in made simply by flexing the contact arm at its reduced midsection whereby the second end portion is positioned above the casing surface with the first end portion within the wider inner channel and the reduced midsection within the narrower outer channel. When the contact arm is released in this position, its resiliency causes the second end portion to press downwardly against the casing surface and thereby holds and maintains the contact arm in this fixed position.

BRIEF DESCRIPTION OF THE DRAWINGS

For a more complete understanding of the invention reference should be made to the drawings, in which:

FIG. 1 is an exploded perspective view of a portion of an improved electrical contact assembly embodying the present invention and which shows a single contact arm and a portion of the assembly casing having a slot;

FIG. 2 is still another perspective view of a portion of the electrical contact assembly with the contact arm being inserted into the casing slot; and FIG. 3 is a perspective view of the electrical contact assembly shown in FIG. 1 as used in a battery charger.

DETAILED DESCRIPTION OF THE PREFERRED EMBODIMENT

Referring now to FIG. 1, an electrical contact assembly 10 is shown prior to assembly as comprising a resilient metallic contact arm or element 11 which is intended for installation within a casing 12, the latter having a top surface 13 with an inverted T-shaped slot, identified generally as 14, along the surface 13 and an opening 14a at one end thereof. Slot 14 comprises a first, narrow rectangularly shaped outer channel 15 cut in the surface 13 of casing 12 and a second, somewhat wider, rectangularly shaped inner channel 16. A rectangularly shaped opening 17 is provided in casing 12 adjacent to and in front of open end 14a, substantially as shown. The electrical contact assembly contemplates a plurality of the contact arms or elements, but for clarity the illustration and description of only one such element is provided.

Contact arm 11 comprises a first end section (portion) 20 dimensioned to make a sliding fit within inner channel 16, a flexible resilient midsection 21 somewhat narrower than channel 15 and designed to make a sliding fit therewithin, and a second end section 22 somewhat wider than outer channel 15. The juncture of end section 22 and the reduced section 21 provides a sharp knife edge 23, the purpose of which will be explained subsequently. The second end portion 22 includes an upwardly extending tab 22a. A portion of end section 20, not immediately adjacent to section 21, is formed into a V-shape 24 pointing in a downward direction. Middle section 21 and the parts of end sections 20 and 22 immediately adjacent thereto generally lie in a single plane. Contact arm 11 is preferably formed from a strip of beryllium copper which has been heat treated for spring temper.

Referring to FIG. 2, a portion of electrical contact assembly 10 is shown with associated contact arm 11 in a position for insertion into slot 14 of casing 12. End portion 20 is positioned so that it will slide into channel 16 of slot 14 while midsection 21 is bent or flexed upwardly to position end portion 22 above the casing surface 13. In this position, midsection 21 will effectively slide through channel 15. The width and thickness of inner channel 16 of slot 14 are larger than the corresponding width and thickness of end section 20 of contact arm 11. The width of outer channel 15 of slot 14 is smaller than the width of end sections 20 and 22 but larger than the width of midsection 21.

After a portion of end section 20 of the contact arm 11 is slid into channel 16, the resiliency of middle section 21 will force end 22 downwardly and into contact with surface 13. A pair of downward projections 23a, located along knife edge 23, will engage surface 13 and lock contact arm 11 into position. Projections 23a merely aid knife edge 23 in positively locking contact arm 11 to casing 12. The pressure of end portion 22 against surface 13 is concentrated along knife edge 23 and is sufficient to hold arm 11 in a fixed position after it is inserted. Thus by grasping contact arm 11 in one hand and by bending end portion 22 upward with another hand grasping projecting tab 22a, contact arm 11 can be hand-inserted into slot 14 and a self-locking sliding electrical contact assembly which is hand-insertable and hand-removable has been provided. Tab 22a serves as a handle for inserting contact arm 11. Removing the contact arm is accomplished by reversing the above procedure.

Referring to FIG. 3, a battery charger 31 using the inventive contact assembly is shown. Parts corresponding to contact assembly 10, shown in FIGS. 1 and 2, have been given identical numbers. FIG. 3 shows a resilient metallic contact arm 11 inserted into a slot 14 on a surface 13 comprising the exterior surface of a rectangular casing 32 into which a battery 33, having an exposed charging contact window 34, is shown ready for insertion. A part of a first end section 20 of contact arm 11 is in an inner channel 16 of slot 14 and a part of a reduced middle section 21 of contact arm 11 passes through an outer channel 15 of slot 14. A second end 22 of contact arm 11 presses against the casing 32 and locks contact arm 11 into a fixed position because of its resiliency. A rectangular through opening 35 is shown in the wall containing surface 13, and opening 35 is positioned adjacent to an open end 14a of slot 14. A source of charging potential 36 is shown having two terminals 37 and 38, one of which (38) is coupled to contact arm 11 and the other (37) is coupled to battery 33. A V-shaped section 24 of contact arm 11 protrudes inwardly through opening 35. Contact charging window 34 will contact V-shaped section 24 and complete a battery charging electrical circuit when battery 33 is inserted into casing 32.

Thus FIG. 3 shows the inventive contact assembly 10 used along with battery charging apparatus. Source of potential 36 can include any type of control apparatus to regulate the battery charging current.

Thus an inventive electrical contact assembly using a simple one piece electrical contact arm has been demonstrated which is hand-insertable and requires no special mounting or disassembly tools. The contact can therefore be easily replaced when it is found to be defective and the original cost of manufacturing an electrical contact assembly has been substantially reduced by minimizing the amount of labor and materials required.

While I have shown and described specific embodiments of this invention, further modifications and improvements will occur to those skilled in the art. All such modifications which retain the basic underlying principles disclosed and claimed herein are within the scope of this invention.

I claim:
1. An improved electrical contact assembly with hand-insertable, hand-removable self-locking electrical contact arms, comprising in combination:
   at least one contact arm having a first end section, a reduced middle section, and a second end section, said contact arm being constructed of a resilient metallic material; and
   a casing for receiving and mounting said contact arm in a fixed position, said casing including an inverted generally T-shaped open ended slot along one surface thereof, said slot comprising a narrow outer channel running along and opening onto said surface and a wider inner channel opening into said outer channel;
   a portion of said first end section of said contact arm making a sliding fit and positioned within said wider inner channel and a portion of said reduced middle section making a sliding fit and positioned within said outer narrower channel, said second end section of said contact arm pressing downwardly toward said casing to maintain said contact arm in said fixed assembled position.

2. An improved electrical contact assembly according to claim 1 wherein said resilient metallic material is beryllium copper.

3. An improved electrical contact assembly according to claim 1 wherein said second end section is wider than said outer channel.

4. An improved electrical contact assembly according to claim 3 wherein the junctures of said reduced middle section and said second end section form a knife edge for contacting and pressing against said casing surface.

5. An improved electrical contact assembly according to claim 4 wherein said knife edge has downwardly facing projections for contacting said casing surface and aiding in locking said contact arm into position.

6. An improved electrical contact assembly according to claim 5 wherein said second end section includes an upwardly projecting tab for grasping when inserting and removing the contact arm from said casing.

7. An improved electrical contact assembly according to claim 5 wherein said first end section has a generally V-shaped section located away from said slot.

* * * * *